May 6, 1930.  S. V. E. TAYLOR  1,757,850
HYDRAULIC GEAR
Filed March 15, 1926   6 Sheets-Sheet 3

INVENTOR.
Scott V. E. Taylor,
BY
Geo. F. Kimmel. ATTORNEY.

May 6, 1930.  S. V. E. TAYLOR  1,757,850
HYDRAULIC GEAR
Filed March 15, 1926   6 Sheets-Sheet 4

Scott V. E. Taylor, INVENTOR.
BY
Geo. P. Kimmel, ATTORNEY.

Patented May 6, 1930

1,757,850

UNITED STATES PATENT OFFICE

SCOTT V. E. TAYLOR, OF ANACONDA, MONTANA

HYDRAULIC GEAR

Application filed March 15, 1926. Serial No. 94,956.

This invention relates to a hydraulic gear and has for its object to provide a gear of such class, in a manner as hereinafter set forth, whereby an infinite variation of speed, in either forward or reverse rotation, of a driven element can be obtained, with the driving means therefor rotating at a constant high speed in one direction and with the torque transmitted to the driven element increasing as its speed decreases.

If a cylindrical vessel is partly filled with liquid and made to rotate, the contained liquid acquires the angular velocity of the vessel and it exerts a hydrostatic pressure against the walls of the vessel whose magnitude is equal to the square of the velocity of the liquid at the point in question divided by the product of $2g$ times the specific gravity of the liquid.

Accordingly if there is placed a spiral shaped pipe into the liquid, there will be a total head on the liquid flowing into the pipe, due not only to the hydrostatic pressure, but also a head due to the velocity of the liquid relative to the pipe, or the total head at its entrance will be equal to $\frac{v^2}{2g} + \frac{(v-v^o)^2}{2g}$ where $v$ = average absolute velocity of the liquid over the cross sectional area of the pipe
$v^o$ = average absolute velocity of the pipe about the center of rotation.

Also if there is placed a vane in the rapidly moving liquid, the liquid will exert a force on the vane equal to the hydrostatic pressure of the fluid against it, normal to the axis taken from the vane plus the product of the mass of liquid that flows over the vane in one second of time and the difference in velocities at entrance and exit of liquid relative to the same axis and $(1 - \cos a)$ where $a$ is the total angle through which the liquid rotates before leaving the vane. If $\cos a$ is made equal to zero, the total force of the liquid against the vane will evidently be a maximum for any given combination of speeds of the liquid and vane, which is exactly the condition existing in the hydraulic gear in accordance with this invention.

Further objects of the invention are to provide, in a manner as hereinafter set forth, a gear of the class referred to, which is comparatively simple in its construction and arrangement, strong, durable, compact, thoroughly efficient in its use, having a simple and positive control, readily assembled and installed with respect to a driving means thereof, and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to, which fall within the scope of the claims hereunto appended.

In the drawings wherein like reference characters denote corresponding parts throughout the several views:—

A hydraulic gear, in accordance with this invention, comprises a driven section which is always connected to the driven shaft, a driving section which is operated from a motor, steam turbine, or other prime mover, and an intermediate or controller section.

Referring to the drawings in detail 16 indicates a housing forming a chamber 17. One end of the housing 16 is closed by an annular head plate 18 and its other end by an annular head plate 19. The plates 18 and 19 are secured to the ends of the housing in any suitable manner. The plate 18 is of greater thickness than the plate 19 and is formed of three different inner diameters, the portion of largest diameter is indicated at 20, the portion of smallest diameter at 21 and the portion of intermediate diameter at 22. The inner diameter of the plate 19 is the same as the largest inner diameter of the plate 18. The plates 18 and 19 form the end walls for the chamber 17. The housing 16 is formed at its top with an opening having a tapered wall and with the wall thereof threaded. The opening is indicated at 23 and closed by a peripherally threaded tapered plug 24. The providing of the intermediate portion 22 at the inner edge of the plate 18 forms a shoulder 25. The plate 18 is furthermore provided with an opening 26, in which is secured a removable closure plug 27 therefor. The cylindrical wall of the chamber 17 is provided with a pair of spaced annular shoulders 28, 29. Positioned against the shoulders 25, 28 and 29 are respectively bearing rings 30, 31 and 32. Arranged against the inner side of the plate 19 or in other words against the inner edge of the plate 19 is a bearing ring 33. Arranged within the bearing rings 30, 31, 32 and 33 are respectively bearing rings 34, 35, 36 and 37. Interposed between the associated bearing rings of each pair is a series of bearing balls 38. The opposed faces of the bearing rings of each pair are grooved as at 39 to provide a raceway for the balls. The bearing rings 30, 31, 32 and 33 do not revolve as they remain stationary with the housing 16 and the end or head plates 18, 19 therefor. The bearing rings 34, 35, 36 and 37 are a part of the driving section and are carried therewith during the operation thereof. The base of the housing 16 is indicated at 40 and is formed with extensions 41 which project beyond the plates 18 and 19 and are provided with openings 42 for the passage of hold-fast devices to fixedly secure the housing in a stationary position.

The driving section includes a prime mover which by way of example is shown as an electric motor 43 having its shaft 44 of the quill type and said shaft 44 extends through the plate 19 and into the chamber 17. That end of the shaft 44 within the chamber 17 is provided with an outwardly extending annular flange 45 and said shaft is furthermore formed with a peripheral shoulder 46 against which abuts the bearing ring 37 and the latter is carried with the shaft 44. Arranged within the chamber 17 and extending into the plate 18 is a flanged collar 47 having its flange 48 of the same diameter as the flange 45 and opposing the inner face, as well as being spaced from the plate 18. The collar 47 is formed with a peripheral shoulder 49 against which abuts bearing ring 34 and the latter is bodily carried with the collar 47. The flange 45 is spaced from the inner face of the plate 19. Fixedly secured to the flanges 45, and 48 is a driving member 50 which consists of a hollow cylinder of a length to have its edges flush with the outer faces of the flanges 45 and 48. The inner face of the cylinder which forms part of the driving member 50 is provided throughout with longitudinally extending, spaced, radially disposed vanes 51 having tapered free terminal portions 52. Each end of each of the vanes is formed with a reduced terminal portion 53 to provide a clearance for a purpose to be presently referred to.

The driving member 50 is keyed to the flange 45 as at 54. The flange 48 is formed with an opening 55, closed by a removable plug 56. The driving member 50 is supported by the bearing rings 35, 36, in connection with the bearing rings 31 and 32 and with the balls 38 interposed between such rings in the manner as shown. The inner end of the quill shaft 44 is formed with an annular groove 57 of T-shaped contour in cross section and the inner end of the collar 47 is formed with an annular groove 58 of T-shaped cross section. The grooves 57 and 58 are of the same diameter. The function of such grooves will be presently referred to.

The controller section which is interposed between the driving section and driven section includes a pair of quill shafts 59, 60 arranged in lengthwise opposed relation with respect to each other and further spaced an appropriate distance apart. The shaft 59 is of materially greater length than the shaft 60. The shaft 59 extends through the motor 43 and also through the shaft 44 and said shaft 59 projects a substantial distance inwardly from the inner end of the shaft 44. That is to say the shaft 59 extends a substantial distance from the flanged end of the shaft 44. The shaft 59 is slightly cleared by the shaft 44. Spaced from the outer end of the motor 43 is a stationary bearing standard 61 through which extends the shaft 59 and the latter projects a substantial distance from the outer side of the standard 61. The outer side of the standard 61, at the top thereof, is formed with a bevelled clutching face 62. Connected to and slidably mounted on the outer end of the shaft 59 is a clutching member 63, having a bevelled end 64, which coacts with the bevelled face 62 of the standard 61. The clutching member 63 is provided with an annular groove 64' and opening into said groove 64' is an opening 65 formed in said member 63. The function of the clutching member 63, as well as the bevelled face 62 will be presently referred to. The clutching member 63 projects outwardly a substantial distance from the outer end of the shaft 59. The shaft 60 projects a substantial distance outwardly with respect to the plate 18 and has slidably connected to its outer end as well as projecting therefrom, a clutching member 66 formed with an annular groove 67 opening into an opening 68, formed in the member 66. The outer face of the plate 18 is formed with a bevelled clutching face 69 which associates with the bevelled end 70 of the clutching member 66. The outer end of the clutching member 63 is formed with a bevelled face 71 and the outer end of the clutching member 66 is provided with a bevelled clutching face 72. The function of the clutching member 66 will be presently referred to.

Figures 3, 8, 9, 10:
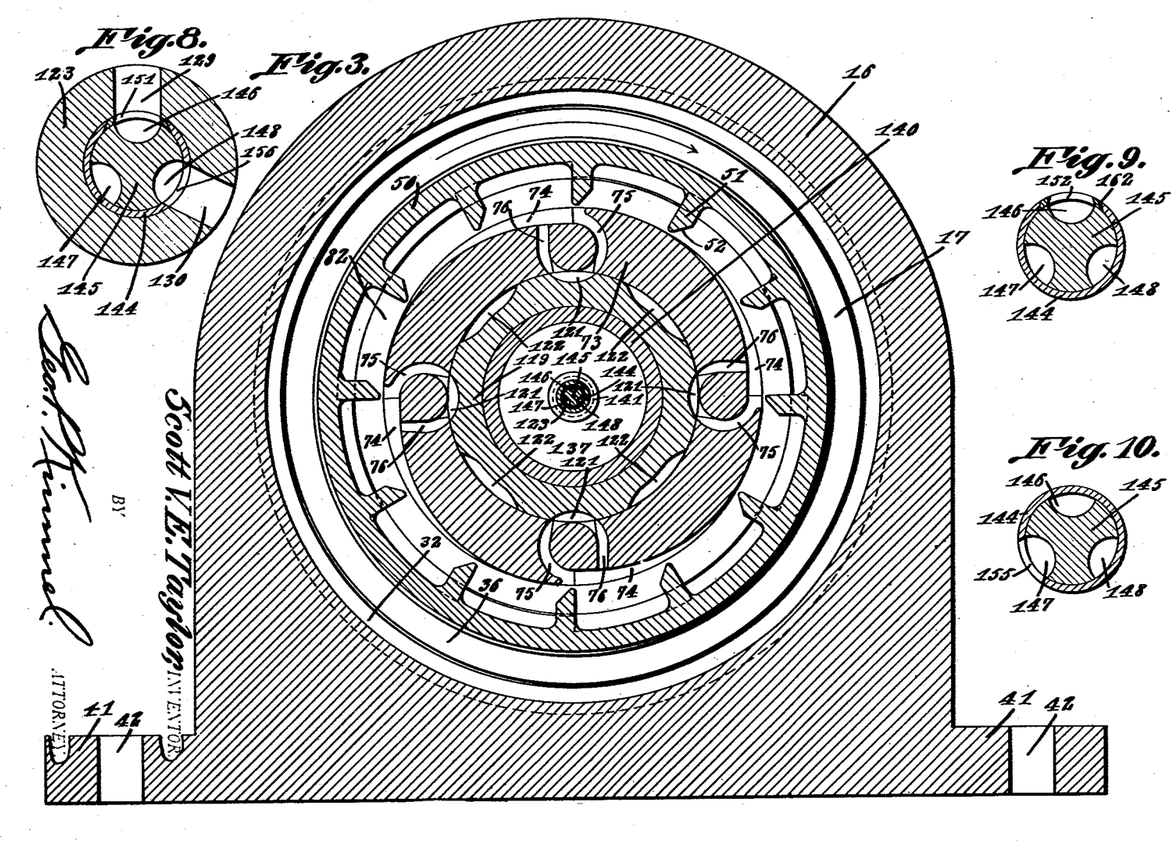
Figure 3 is a section on line 3—3 Figure 1A.
Figure 8 is a section on the line 8—8 Figure 1A.
Figure 9 is a section on line 9—9 Figure 1A.
Figure 10 is a section on line 10—10 Figure 1A.

Arranged between the shafts 59 and 60, as well as being connected therewith, is a tubular member 73, of the cross sectional form as shown in Figure 3. The member 73 constitutes a fluid guiding or controlling element when held stationary, in a manner as hereinafter referred to, and a propelled element when clutched to a driven element to be hereinafter referred to. The member 73 has its periphery provided with tangentially disposed grooves 74, four in number and equally spaced with respect to each other and each of the same length. Each groove gradually decreases in depth from its rear towards its forward end and the forward end thereof opens into a semi-circular port 75 and the latter opens at the inner face of the member 73. Each groove 74 furthermore opens, at a point adjacent its forward end, into a partially-circular port 76, which is oppositely disposed with respect to the port 75, spaced therefrom, and said port 76 opens at the inner face of the member 73. The inner ends of the ports 75 and 76 are spaced from each other but communication is established between said inner ends in a manner to be presently referred to. The member 73 at each end is formed with a set of spaced stems 77 which are shrunk upon the shafts 59 and 60 and mounted upon the said shafts, as well as enclosing each set of stems 77, is a series of segmental shaped holders 78 and one of which is provided with an opening 79, in which is mounted a block 80. Each set of holders 78 has shrunk thereon a retaining ring 82, provided with an opening 82' in which is arranged a block 83. The block 80 is keyed to the ring 82 as at 84.

Each end of the member 73 is formed with an annular groove 85 which is T-shaped in cross section and one of said grooves oppose the groove 57 and the other the groove 58 and mounted in the opposed grooves is an H-shaped cross sectional packing 86 in the form of an annulus and constructed of resilient material.

The shaft 59, as well as the shaft 60, has mounted therein a block 87. The block 80 is keyed to that shaft 59 or 60 upon which it is mounted, as indicated at 89. The grooves 74 are provided by forming the outer periphery of the member 73 with tangentially disposed surfaces which form the bottoms of the grooves 74 and the end walls of said grooves are provided by the holders 78. The end terminal portions 53 of the vanes 51 provide clearances for the retaining rings 82. The vanes 51 clear the high part of the periphery of the member 73.

The driven section includes a driven shaft formed of two spaced sections 92, 93. The section 92 is provided with a bore 94 which extends from a point removed from the outer end thereof and terminates at its inner end. The outer end of the section 92 carries a bearing ring 95 upon which is mounted a cage 96 carrying bearing balls 97 and surrounding the cage is a bearing ring 98. The bearing rings 95 and 98 are supported in a stationary standard 99 into which extends the outer end terminal portion of the shaft section 92. Carried by the shaft section 92 and opposing the clutching member 63 is a clutching element 100 having a bevelled inner face 101 which cooperates with the bevelled end 71 of the clutching member 63. A portion of the clutching member 63 surrounds the shaft section 92 and the latter is formed with a diametrically disposed opening 102 through which extends a shifting bar 103, having its lower end mounted in an annular groove 64' and its upper end positioned in an opening 65. The groove 64' and opening 65 are formed in the clutching member 63. The actuating means for the shifting bar 103 will be hereinafter referred to. The bar 103 when actuated in one direction will move the clutching member 63 into engagement with the clutching element 100 and when moved in the other direction will shift the clutching member 63 in engagement with the bevelled face 62 of the standard 61. The shaft section 92 extends through the shaft 59 and projects from the inner end of the latter an appropriate distance.

The shaft section 93 is provided with a bore of two different diameters and that portion of the bore of larger diameter is indicated at 104 and the portion of smaller diameter at 105. The shaft section 93 is also formed with a diametrically extending opening 106. The larger portion of the bore 104 extends from the inner end of the shaft section 93 and terminates in the opening 106. The smaller portion of the bore 105 extends from the opening 106 and terminates at a point removed from the outer end of the shaft section 93 and opens into a diametrically extending opening 107. The shaft section 93 extends an appropriate distance inwardly with respect to the inner end of the shaft 60 and further extends outwardly from the outer end of said shaft 60. The clutching member 66 carried by the shaft 60 extends around the opening 106 and projecting through the latter is a shifting bar 108 which is mounted in annular groove 67 and extends into the opening 68 of the clutching member 66. Carried by the shaft section 93 outwardly with respect to the clutching member 66, as well as associated therewith, is a clutching element 109 having a bevelled inner end 110 which cooperates with the bevelled outer end 72 of the clutching member 66.

Mounted on the shaft section 93 is a bearing ring 111 for supporting a cage 112 provided with bearing balls 113 and surrounding the cage 112 is a bearing ring 114. The bearing rings 111 and 114 are supported by an apertured standard 115 through which extends the shaft section 93.

Extending through the opening 107 is a shifting bar 116 which is carried by a grooved collar 117 slidably mounted on the shaft section 93 and operated through the medium of a link and lever mechanism 118.

Interposed between the shafts 59 and 60 and surrounding the inner ends of the shaft sections 92 and 93, as well as being secured to the said shaft sections is a fluid controller in the form of a tubular shell or casing 119, which provides a piston chamber 120. The periphery of the shell 119 is formed with a series of lengthwise extending concavities 121 and as shown in Figure 3 each of the concavities establishes communication between the ports 75 and 76. The periphery of the shell 119 is furthermore provided with a series of concavities 122 disposed lengthwise thereof and each of which is of a greater width than either of the concavities 121. The concavities 122 are alternately disposed with respect to the concavities 121. The concavities 122 are equally spaced with respect to each other and like arrangement is had with respect to the concavities 121.

Shiftably mounted in the bore 94 of the shaft section 92 is a piston rod 123, which extends from the opening 102 and projects inwardly from the inner end of the shaft section 92. The outer end of the piston rod 123 is secured to the shifting bar 103, as at 124. The inner terminal portion of the piston rod 123 is formed with a longitudinally extending socket 125 which opens at the inner end of said rod 123. The piston rod 123 is formed with a series of spaced radially disposed ports 126, 127 and 128 positioned as disclosed in Figures 5, 6 and 7 respectively. The port 126 is larger than the port 127 and the port 128 is larger than the port 127. The piston rod in that portion which projects from the inner end of the shaft section 92 and in proximity to the latter is formed with a pair of oppositely extending radially disposed ports 129 and 130, more clearly shown in Figure 8. Carried by the inner end of the piston rod 123 adjacent to the ports 129 and 130 is a piston referred to generally by the reference character 131. The inner terminal portion of the piston rod 123 is of enlarged outer diameter, has its terminus outwardly flanged, see Figure 1A, and to said portion of enlarged diameter is secured a piston referred to generally by the reference character 131.

Figures 4, 11, 12:
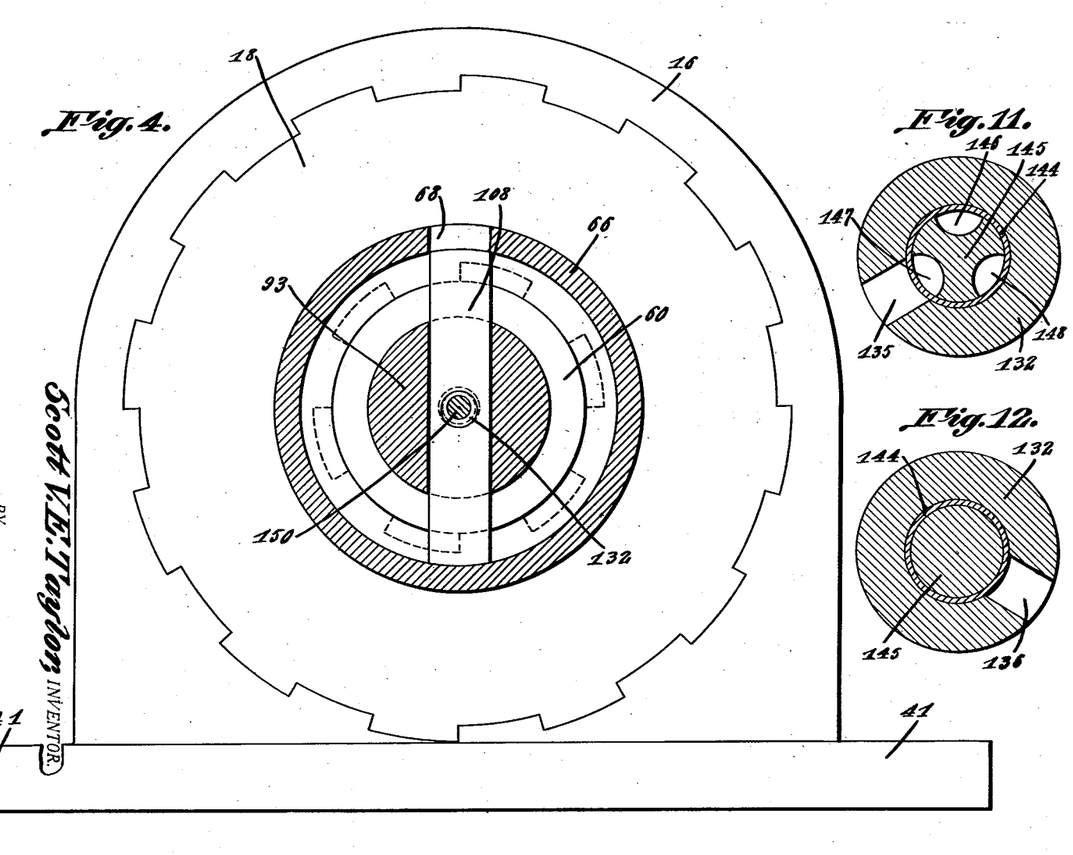
Figure 4 is a section on line 4—4 Figure 1A.
Figure 11 is a section on line 11—11 Figure 1A.
Figure 12 is a section on line 12—12 Figure 1A.

Slidably mounted in the enlarged portion 104 of the bore of the shaft section 93 is a tubular piston rod 132 which projects a substantial distance inwardly from the inner end of the shaft section 93 and has its outer end terminate in the opening 106 in said shaft section 93. The outer end of the piston rod 132 is secured as at 133, to the shifting bar 108. The inner end of the piston rod 132 is enlarged and flanged and has secured therewith a piston referred to generally by the reference character 131. The piston rod 132 is provided in proximity to the piston 131 carried thereby with a pair of oppositely extending ports in the same manner as the piston rod 123 and the same reference characters 129 and 130 are employed for the ports in the piston rod 132 and such ports are arranged as illustrated in Figure 8. The piston rod 132 is also provided intermediate its ends with a port arranged in the same manner as the port 127 in the piston rod 123 and the same reference character is applied thereto. The piston rod 132 is furthermore provided with a pair of oppositely extending ports 135 and 136 shown in Figures 11 and 12 respectively and said ports are arranged in the piston rod 132 at the points indicated by the cross sectional lines 11—11, 12—12, Figure 1A.

As the construction of each of the pistons is the same, but one will be described, as the description of one will apply to the other. Each of the pistons consists of a circular disc 137 mounted on its respective piston rod and which carries a packing ring 138 having its body portion of less width than the thickness of the disc 137. Opposing the disc 137 and mounted on the piston rod is a pair of oppositely disposed cup-shaped members 139, 140 which abut the ring 138, seat on the edge of the disc 137 and are spaced from both faces of the latter. Common to and seated in a piston rod, a disc 137 and a member 140 is a packing ring 141. The elements 137 to 141 inclusive are clamped in position, by a nut 142 which has threaded engagement with the periphery of the piston rod and said nut 142, in connection with the flange 143, which abuts the member 140, fixedly secures the piston in position.

Slidably mounted in the opposed inner ends of the piston rods 123 and 132 is an elongated tubular valve casing 144 which encloses a valvular member 145 formed with lengthwise extending, spaced, semi-circular grooves 146, 147 and 148 and which constitute channels. The free end terminal 149 of the valvular member 145 is not grooved, but is of a diameter to snugly fit the inner face, at one end, of the casing 144 whereby one end of each of the said channels is closed. The channel 146 carries the pressure liquid. The valvular member 145 forms a continuation of a valve stem 150, which is circular in cross section and closes the other ends of the channels. The valve stem 150 projects outwardly from the piston rod 132 and is mounted in the smaller portion 105 of the bore of the shaft section 93 and extends into the opening 107 formed in said shaft section 93 and is fixedly secured as at 150' to the shifting bar 116.

Figure 14:
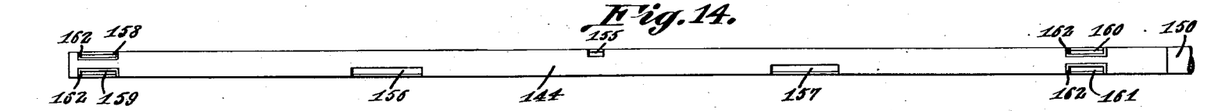
Figures 14 and 15 are fragmentary views of the valve casing in bottom and top plan respectively.
Figure 15:
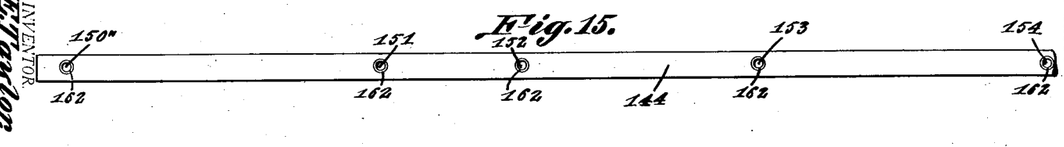

The valve casing best shown in Figures 14 and 15 has its top provided with a series of openings or ports 150'', 151, 152, 153 and 154 and which are arranged in spaced relation. The valve casing is formed in one side, below the top thereof, with a rectangular port 155 approximately centrally thereof and at the other side thereof with a pair of rectangular ports 156, 157 of greater length than the port 155 and the ports 156 and 157 are spaced from the port 155 and arranged on each side thereof. Near each end of the valve casing and at each side of the bottom thereof is arranged a rectangular port. The ports at one end are indicated at 158 and 159 and at the other end at 160 and 161. The openings 150'' and 154 are positioned in proximity to the ends of the valve casing and the openings 151, 152 and 153 are positioned intermediate the ends of the valve casing. The opening 152 is arranged approximately centrally thereof.

The port 126 formed in the piston rod 123 coacts with the port 158 and constitutes an exhaust port for space C of the piston chamber 120. The ports 127 in the piston rods 123 and 132 coact with the ports or openings 150'', 154 to provide an inlet for pressure at each end of the channel 146. The port 128 in the piston rod 123 coacts with the port 159 and provides an exhaust for the space B² of a piston chamber 120. The port 135 in the piston rod 132 coacts with the port 160 and provides an exhaust for the space C of the piston chamber 120. The port 136 in the piston rod 132 coacts with the port 161 and provides an exhaust for the space B¹ of the piston chamber 120. The two ports 129, one in each piston rod, one in connection with the port 151 and the other in connection with the port 153, provide pressure inlets for the channel 146 and the two ports 130, one in each of the piston rods, one in connection with the port 156, and the other in connection with the port 157 provide exhausts for the spaces B¹ and B² of the piston chamber 120. The port 158 opens in the channel 147, port 159 opens in the channel 148, port 156 opens in the channel 148, port 155 opens in the channel 147 and into the space C of the piston chamber 120, port 157 opens in the channel 148, port 160 opens in the channel 147, and port 161 opens in the channel 148. Ports 150'' to 154 inclusive open into the channel 146, and each of said ports has its edge provided with a packing element 162, see Figure 6. The ports in the piston rods have seated in the walls thereof at the outer ends thereof packing means, as indicated at 163, Figure 6 and said means is of rhomboidal contour. Each piston rod may be provided on its periphery with spaced packing elements.

It will be noted that the port 129 for the pressure in piston rod 123 is longer than the corresponding port 129 in piston rod 132. This is because the liquid under pressure when used in spaces B¹ and B² drives the pistons toward the center, consequently the valve 145 being thrown to the left to close pressure port 152 into space C and opening exhaust ports 158 into 126 and 160 into 135, the valve stem then remaining stationary; the piston rods 123 and 132 will move toward one another tending to close one of the ports 129 and to open the other port 129; hence port 129 in rod 123 has to be made longer than the other port 129, on the other hand port 129 in rod 132 has to be made shorter than the other port 129 for exactly opposite reasons when pressure is applied in space C as piston rod 132 is moving in a direction tending to uncover a port 153, the piston rod now having been drawn to the right and to cover ports 151, and 153.

Figures 2, 5, 6, 7:
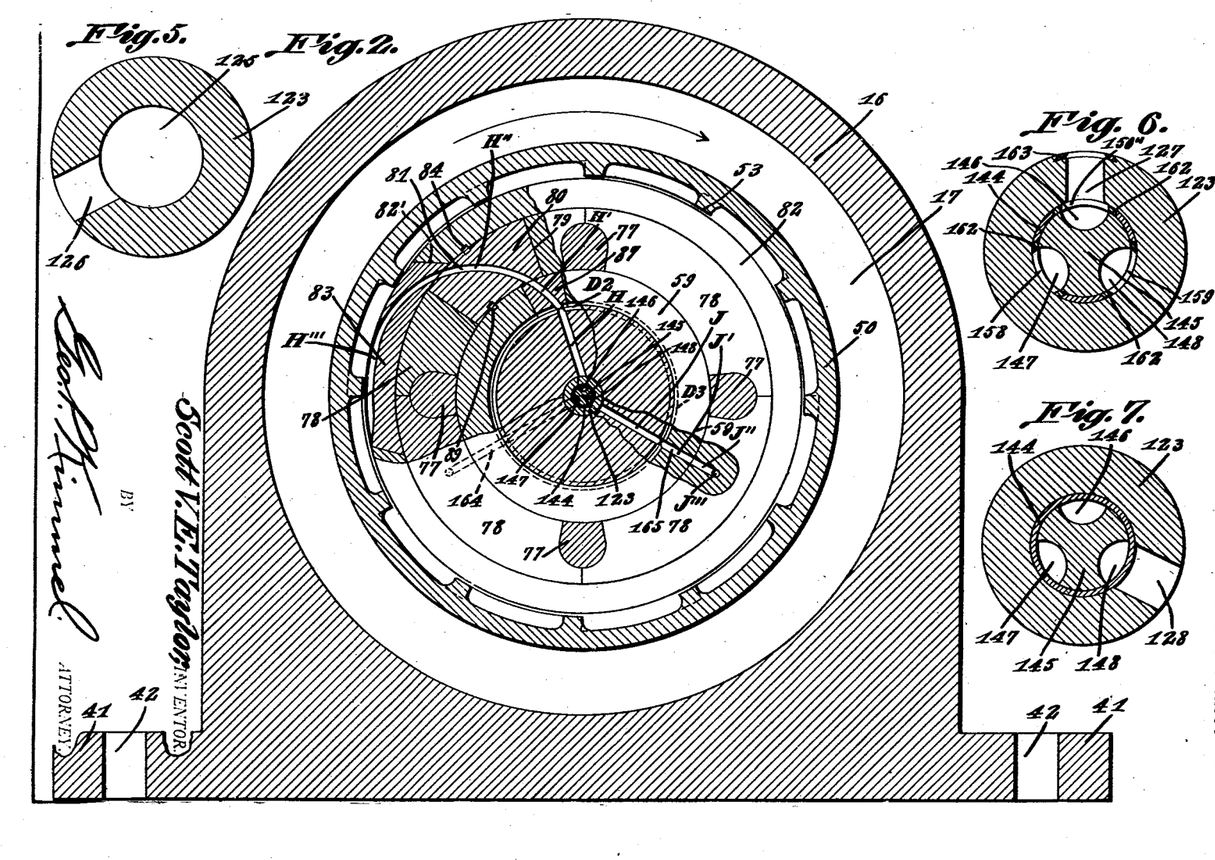
Figure 2 is a section on line 2—2 Figure 1A.
Figure 5 is a section on line 5—5 Figure 1A.
Figure 6 is a section on line 6—6 Figure 1A.
Figure 7 is a section on line 7—7 Figure 1A.

A pair of sectional pressure supply passages are employed and each of which is referred to generally by the reference character 81. Each pressure supply passage extends through a block 80, a block 83, a block 87 and one of the shaft sections 92 or 93. The contour of each pressure supply passage 81 is shown in Figure 2.

The inner face of the shaft 59 near its inner end is formed with a set of spaced annular grooves and the periphery of the shaft section 92 is provided with a set of annular grooves. The grooves in the shaft section 59 and on the shaft section 92 are semi-circular in contour and the said sets of grooves register to provide annular channels D¹, D² and D³. The shaft 60 and the shaft section 93 are provided with a set of annular channels similar to the shaft 59 and shaft section 92.

Two pair of sectional exhaust passages or channels are provided. The exhaust passages of each pair are referred to generally by the reference characters 164, 165 and said passages are clearly shown in Figure 2. One pair of exhaust passages is formed in the shaft section 92, shaft 59 and certain of the holders 78 of one set and the other pair of exhaust passages is formed in the shaft section 93, shaft 60 and certain of the holders 78 of the other set. Each exhaust passage 164 is provided for exhausting from the space C of the piston chamber 120. One of the exhaust passages 165 is employed for exhausting from the space B² of the piston chamber 120 and the other exhaust passage 165 is employed for exhausting from the space B¹ of the piston chamber 120. Both exhaust passages are set up in a direction parallel to the axis of the gear and slightly below the liquid line.

Figure 1:
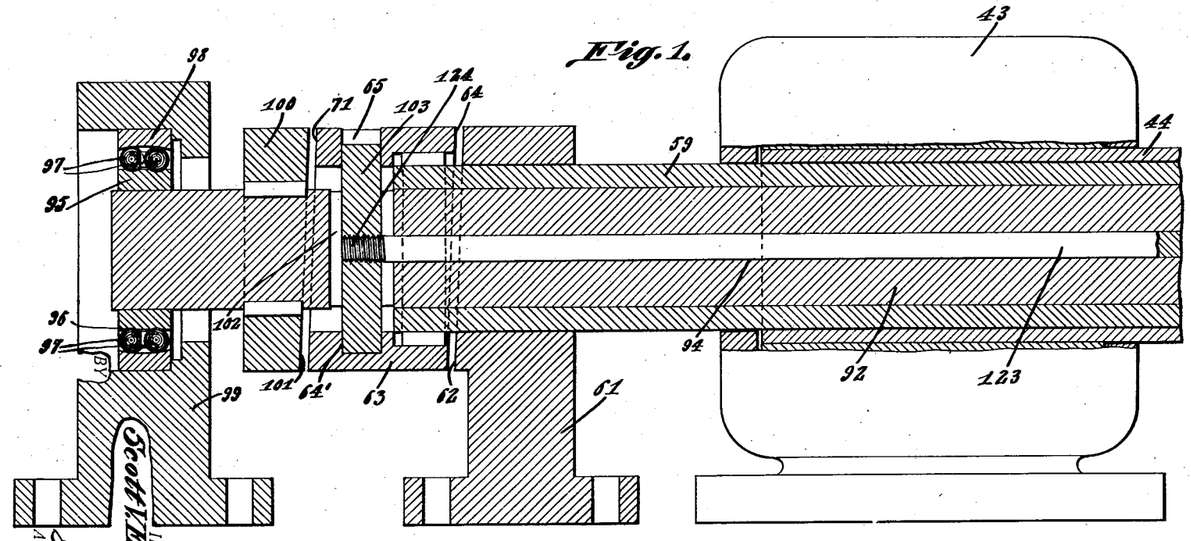
Figures 1, 1A and 1B, when taken together illustrate a longitudinal sectional view of a hydraulic gear in accordance with this invention.
Figure 1A:
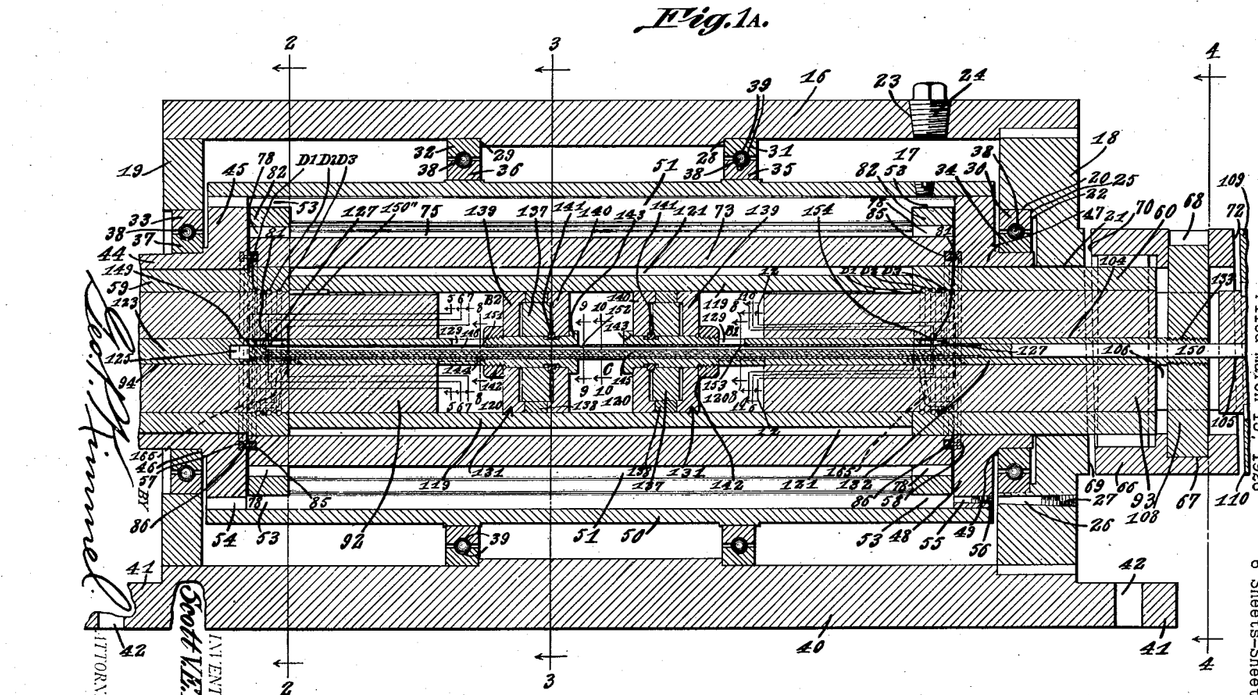
Figures 1B, 13:
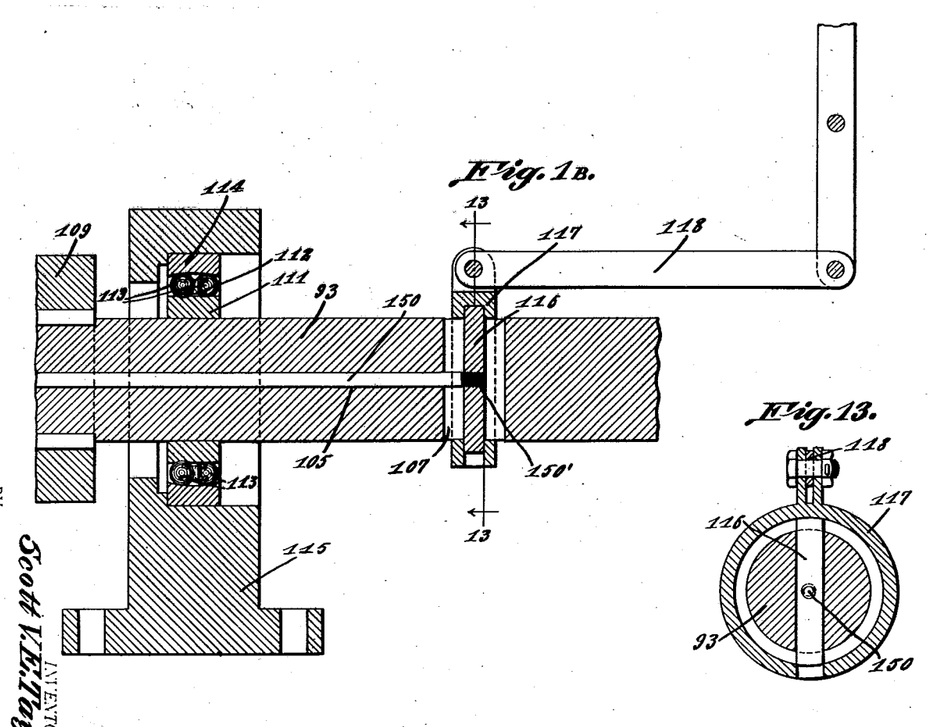
Figure 13 is a section on line 13—13 Figure 1B.

Each channel D² is to connect sections of a pressure passage together. The channels D¹ are to connect sections of each of the exhaust passages from space C together. One of the channels D³ is to connect sections of the exhaust passage from space B² together and the other channel D³ is to connect sections of the exhaust passage from the space B¹ together. Between the channels D¹ and D² at one side of the gear is interposed a packing to confine any liquid from the channel D² to the inside of the gear. The same arrangement is had at the other side between channels D², D³. When it is desired to fill the gear with liquid, the plugs 24 and 27 are removed after the gear has been placed in the position as shown in Figures 1, 1A and 1B. Plug 56 is then removed and one leg of a rubber tipped L-shaped piece of glass inserted through the opening 26. The rubber tipped end of the glass is extended into the opening 55 and the other leg of said L-shaped piece of glass is calibrated so that one may know how much liquid to pour into the gear. The liquid is then poured into the gear through the open holes until the gear has received the required amount of liquid. It is evident if the level of liquid should reach in further toward the center than the edges of the exhaust port the gear would not function properly, and therefore it should be carefully noted that too much liquid is not put into the gear.

The packing elements 85 and 86 are required to confine the liquid when the gear is idle. They are fixed in the driving section, but clear the controller portion slightly so that there will be a minimum amount of sliding friction between them and the controller section. When pressure is exerted against the packing, it will bear against the web portion thereof thus tending to rotate it outward from the axis of the gear and flattening against the grooves, securely binding it against the sides of the grooves thus preventing leakage.

Each pressure supply passage consists of a section H formed in a shaft section 92 or 93, a section H' formed in a block 87, a section H'' formed in a block 80 and a section H''' formed in a block 83. The section H is disposed at an inclination, the section H' curved, the section H'' curved, the inner portion of the section H''' curved. The sections H', H'' and the curved part of the section H''' extend upon the same arc and the remaining portion of the section H''' is disposed tangentially.

Each of the exhaust passages 164 or 165 consists of a section J formed in a shaft section 92 or 93, a section J' formed in a shaft 59 or 60, a section J'' formed in a holder member 78 and the said section J'' has a right angular extension J''' opening at the outer side of a holder member. The exhaust passages 164 extend in an opposite direction with respect to the exhaust passages 165.

As to the actual operation of the gear, the driving member being constantly connected to the prime mover, as hereinbefore set forth, imparts a rotary movement to a body of liquid preferably of high conductivity, boiling point, good lubricating qualities, low coefficient of friction on metal surfaces together with high viscosity, and specific heat and sometimes high specific gravity which liquid acts as the elastic medium furnishing both potential and kinetic energy to convert high speed and low torque in the driver to low speed and high torque in the driven section.

Assuming that the gear is in its neutral position as shown and the driving section is travelling at the same angular speed as the driving member 50 and a forward drive is desired, the collar 117 is shifted to the right by the link and lever mechanism 118 and such action shifts the bar 116 in the same direction, which in turn will move the valve stem 150 outwardly thus bringing the center of the port 152 in the valve casing 144, to the vertical central axis of the gear and closing ports 151 and 153, at the same time moving exhaust port 159 for space B² over exhaust port 128 and moving exhaust port 161 for space B¹ over exhaust port 136. The liquid under pressure will flow down through sections H''', H'' and H' of the supply passage 81, and then around channel D² until it meets section H of the supply passage, as section H cannot remain exactly coincident with the end of section H' when the controller portion is moving relative to the driven portion. Then the liquid under pressure flows down through section H, through ports 127 in the piston rods, through ports 150'' and 154 into channel 146 and out through port 152, and move pistons in opposite directions away from each other carrying their rods therewith forcing the liquid from space B² through one of the ports 130 and port 156 and along channel 148 and out through ports 159, 128 into section J of the exhaust passage 165, around channel D³ and then out through sections J', J'' and J''' of the exhaust passage 165 and into the space between the driving and the controlling sections. Simultaneously with this action the liquid from the space B¹ is forced through the other port 130 and port 157 into channel 148 and ports 161 and 136 into the other exhaust passage where it is discharged. When the piston rods are moved in an opposite direction, the two clutching devices will become active so as to clutch together the controller and driven sections so that they will revolve as a unit, and each of the concavities 121 of the fluid controller will establish communication between and match the pair of ports 75 and 76.

Due to the enormous kinetic energy of the rapidly moving controller section, there may not at first be sufficient thrust exerted by the hydrostatic pressure to hold the clutching faces in alignment, and will be thrown out of alignment. The stroke of either piston backwards towards the vertical central axis of the gear will be equal to twice the rise of the clutch faces and they will be forced into alignment again, however, and the cycle will be repeated until all the kinetic energy of the controller section is used up in pumping the liquid out of space C. Thus the clutch arrangement not only provides for positive alignment of parts of the gear, but also gradual engagement with a minimum amount of shock.

The fluid under the impetus of the vanes enters the grooves or channels 74, ports 75, 76 and concavities 121. The fluid enters almost tangentially and describes an arc of 270 degrees and emerging in a radial direction. The cross section of the passages or ports remain constant in area up to the 270 degree point from which station it deceases uniformly. The total decrease in angle being about 10 degrees. As stated the ends of the vanes 51 are bevelled or in other words they are tapered at an angle about 45 degrees with their long radial flank to direct the stream emerging from these passages in the direction of rotation of the driving member. The number of passages provided in the controller section will depend mainly upon the space limitations imposed and peripheral speed at which it is desired to operate the driving section; as their number is decreased with a proportional increase of cross sectional area of each, the stress on the segmental-shaped holders 78 decreases as the square of a greater power of the initial number of passages divided by the chosen number of passages. Also if one can safely use high peripheral speeds, less cross sectional area of passages is required due to the increased arm of action, hydrostatic pressure and kinetic energy of the liquid.

Now suppose it is desired to travel from either forward drive or neutral into reverse, then the link and lever mechanism 118 is actuated to shift the collar 117 to the left and which will shift the rod 116 also to the left and then valve stem 150 will be moved inwardly, thus moving ports 151 and 153 to the left so that they open into the ports 129 of the piston rods, at the same time closing pressure supply port 152 which leads into space C and moving exhaust port 158 from space C over exhaust port 126 and also moving exhaust port 160 from space C over exhaust port 135. The fluid under pressure will take the same course described in a previous paragraph in the groove 146, and from the latter it will pass out the ports 151 and 129. At the opposite end of the gear the liquid under pressure will flow down into the other piston rod to the other inlet port 127 in the casing 144, along groove 146 and out ports 153 and 129. The pistons will be caused to move towards each other and the liquid from space C will be forced out through the always open exhaust port 155 in the casing 144, along groove 148 in both directions and out through ports 158, 126, 160 and 125 to exhaust passages. The clutching mechanism will be moved in an opposite direction acting on the controller section so that the latter will be held stationary to the housing. The liquid will flow through 180 degrees of the passages in the driving member striking the concave portions 122 of the fluid controller. As the liquid is now travelling in a direction exactly opposite to that in which it enters the driven shaft is reversed. The kinetic energy will first have to be taken up in pumping liquid as described in the preceding paragraph.

The mechanism heretofore described either binds the controller section at both ends to the driven section or to the frame or lets it float freely of either, thus giving the condition of a beam fixed at both ends to the exposed beam portions of the controller section allowing ne to use the minimum amount of material in their construction. Such a beam is six times as efficient as a beam fixed at only one end.

This hydraulic gear gives an infinite variation of speed in either forward or reverse direction of the driven shaft with the driving section rotating at a constant high speed in one direction with the torque transmitted to the driven section increasing as its speed decreases. It functions as stated in a small space and with few intricate parts. It is evident that the torque due to hydrostatic pressure of the liquid against the vanes will be constant at all times regardless of the direction or speed of rotation of the driven section, but the torque due to the kinetic energy of the rapidly moving liquid against the vanes will vary directly in proportion to the differences in the squares of the angular speeds of the driving vane and impeller. Hence the torque will increase as the difference in speed of the two increases, therefore it is thought the many advantages of a hydraulic gear, for the purpose set forth, and in accordance with this invention, can be readily understood and although the preferred embodiment of the invention is as illustrated and described, yet it is to be understood that changes in the details of construction can be had which will fall within the scope of the invention as claimed.

What I claim is:—

1. A hydraulic gear for transmitting power at a reduction comprising a revoluble driven section including means for rapidly rotating a body of liquid contained therein, a controlling section arranged concentrically with respect to and free of connection with said driving section and having means to provide for the flow of the liquid through it in a combined tangential and radial direction in relatively thin sheets, the longitudinal portions of said sheets being parallel to the longitudinal axis of the controlling section, said means of the controlling section providing for the revolving thereof, said controlling section arranged within said driving section, and a revoluble power transmitting driven section arranged concentrically to and within the controlling section and including means acted upon by the fluid driven from the driving section and conducted through the controlling section for operating said driven section and with the flow of the liquid with respect to said driven section being in the same direction as the flow with respect to the controlling section, means for coupling said controlling and driven sections together as a unit to provide for the operation of the driven section in a forward direction, and further providing for the disconnection of the controlling and driven sections to allow the controlling section to revolve free of the driven section thus placing the drive in neutral.

2. A hydraulic gear for transmitting power at a reduction comprising a revoluble driven section including means for rapidly rotating a body of liquid contained therein, a controlling section arranged concentrically with respect to and free of connection with said driving section and having means to provide for the flow of the liquid through it in a combined tangential and radial direction in relatively thin sheets, the longitudinal portions of said sheets being parallel to the longitudinal axis of the controlling section, said means of the controlling section providing for the revolving thereof, said controlling section arranged within said driving section, a revoluble power transmitting driven section arranged concentrically to and within the controlling section and including means acted upon by the fluid driven from the driving section and conducted through the controlling section for operating said driven section and with the flow of the liquid with respect to said driven section being in the same direction as the flow with respect to the controlling section, means for coupling said controlling and driven sections together as a unit to provide for the operation of the driven section in a forward direction and further providing for the disconnection of the controlling and driven sections to allow the controlling section to revolve free of the driven section thus placing the drive in neutral, and means for holding the driven section stationary thus placing the gear in neutral.

3. In a hydraulic gear in accordance with claim 1, said clutching and unclutching means in the form of a hydraulically actuated clutch consisting of a pair of pistons moving towards and away from one another by the pressure created by the fluid driven by the driving section through a spiral shaped passage in the controlling and driven sections, said spiral passage unwrapping from the axis of rotation in a direction opposite to that of the direction of rotation of the driving section, a movable clutching element connected to said pistons, and said clutching element providing for connecting the controlling and driven sections together for a forward drive and for separating them for neutral.

4. In a hydraulic gear according to claim 2, said clutching and unclutching means in the form of a hydraulically actuated clutch including a pair of pistons moving towards or away from one another by the pressure created by the fluid driven by the driving section through a spiral shaped passage in the controlling and driven sections, said spiral passage unwrapping from the axis of rotation in a direction opposite to that of the direction of rotation of the driving section, a movable clutching element connected to said piston and providing for connecting the controlling and driven sections together for a forward drive or to separate them for neutral.

In testimony whereof, I affix my signature hereto.

SCOTT V. E. TAYLOR.